UNITED STATES PATENT OFFICE.

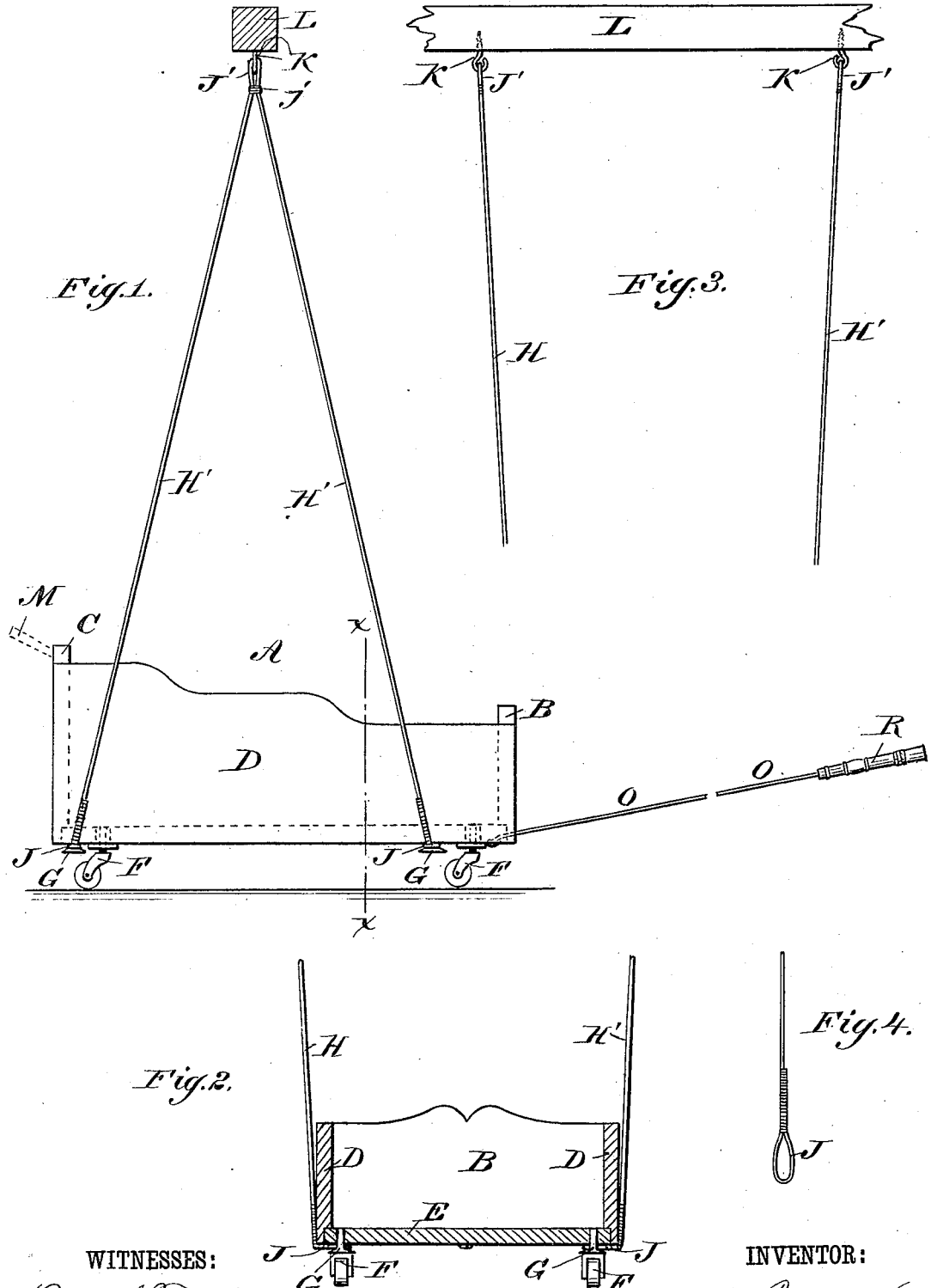

MASON REMLEY, OF HAMDEN JUNCTION, OHIO.

COMBINED WAGON AND SWING FOR CHILDREN.

SPECIFICATION forming part of Letters Patent No. 242,367, dated May 31, 1881.

Application filed April 14, 1881. (Model.)

*To all whom it may concern:*

Be it known that I, MASON REMLEY, of Hamden Junction, Vinton county, Ohio, have invented a new and useful Improvement in Combined Wagons and Swings for Children, of which the following is a specification.

Figure 1 is a side elevation of my improved vehicle, showing the method of connecting it with an overhead beam to convert it into a swing. Fig. 2 is a cross-section on the line $x\ x$, Fig. 1. Fig. 3 is an elevation of both side swing-cords as connected with the overhead beam or lintel, and Fig. 4 shows lower cord-loop.

Similar letters of reference indicate corresponding parts.

The object of my invention is to provide an improved vehicle specially adapted to the use and amusement of children, which shall serve either as a wheeled carriage or as a swing, its construction insuring the comfort and safety of the occupant.

My invention consists of a wagon-body upon low plate caster-wheels, and in providing the body with cords adapted to support it as a swing from an overhead door lintel or beam.

I more particularly describe my invention as follows:

The wagon-body A is here shown formed rectangularly of front B, back C, sides D, and bottom E. Ordinary plate-casters, F, are secured to the bottom E, in which are also fixed the headed pins or studs G, around which are the lower loops, J, of the swing. Cords H H' are shown connected as in Figs. 1 and 2. These cords H H' are formed into upper loops, J', by doubling them and tying the cord $j$ firmly around them, as shown, from whence they diverge to the studs G, where they are looped, as above set forth. The draft-cord O is attached to the front of the wagon, and is provided with a suitable handle, R, by means of which the vehicle may be wheeled about on the casters F as a child's carriage, or for other purposes.

The body A may also have connected therewith the removable tongue or handle M, by which it may also be either pushed or drawn along.

When it is desired to use the vehicle as a swing the draft-cord O may be placed within it and the handle M removed, and the side swing-cords, H H', looped around the studs G or the necks of the casters F, and the upper loops, J', passed into the screw-eyes K, secured in the overhead beam or lintel, L.

The body A of the vehicle may be made of any desired size and be formed with round or square corners, and its ends and sides may be formed of one continuous piece. It may also be painted, upholstered, or otherwise ornamented and finished at varying cost, so that it may be sold at prices to suit all classes of people.

My improved vehicle is quite safe for small children to use as a wagon, as its body is supported on the casters F quite close to the floor or walk upon which it travels, making dangerous falls from it quite impossible, there also being much less danger of its upsetting than of the ordinary high-wheeled vehicles, and the facility with which the cords H H' can be adjusted to make a swing of the vehicle renders it a safe means of healthful indoor or outdoor exercise and amusement for young children.

Having thus described my invention, I claim as new and desire to secure by Letters Patent—

The combined wagon and swing herein shown and described, consisting of body A, having casters F and cords H H', whereby it may be suspended as a swing, substantially as herein set forth.

MASON REMLEY.

Witnesses:
JOHN T. OGIER,
H. B. ROBBINS.